Patented July 22, 1952

2,604,490

UNITED STATES PATENT OFFICE 2,604,490

PRODUCTION OF DICARBOXYLIC ACIDS

Walter Reppe, Ludwigshafen-on-the-Rhine, Germany

No Drawing. Application February 3, 1951, Serial No. 209,329. In Germany February 15, 1950

12 Claims. (Cl. 260—533)

The present invention relates to the production of dicarboxylic acids, more particularly, to the production of aliphatic dicarboxylic acids. It is an object of the present invention to prepare these compounds from cheap and readily available basic materials, i. e. carbon monoxide and low molecular $\alpha,\beta$-unsaturated monocarboxylic acids which, in turn, may be prepared from carbon monoxide, acetylene hydrocarbons and water according to my invention.

It is known in the art that olefines, carbon monoxide and water may be caused to react forming saturated carboxylic acids containing one carbon atom more than the starting material. This known process is generally carried out under the influence of certain catalysts which are capable of forming metal carbonyls. In applying this process to olefinic carboxylic acids, the catalysts so far used are unsatisfactory and give only relatively poor yields in dicarboxylic acids.

I have found, and this constitutes an object of my invention, that dicarboxylic acids are formed in good yields by causing carbon monoxide and water to act on a low molecular $\alpha,\beta$-unsaturated carboxylic acid at elevated temperature and under increased pressure in the presence of cyano or thiocyano compounds of nickel, cobalt and iron in an alkaline medium.

I have also found that the same catalysts are extremely capable of allowing to produce dicarboxylic acids from carbon monoxide, water and acetylene hydrocarbons without the necessity of isolating the $\alpha,\beta$-unsaturated carboxylic acid formed as the primary reaction product.

The most active catalysts which may be used in my invention are the complex cyanides of nickel, e. g. the so-called "Belucci" salt $$K_2[Ni^I(CN)_3]$$

potassium tetracyanoniccolat 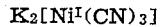 or the corresponding complex salts of other alkali metals such as sodium or lithium, or of alkaline earth metals such as calcium, barium, and magnesium, or of other bivalent metals, such as zinc, cadmium or mercury, or of ammonia as well as the amine compounds. Most suitable catalysts are such complex nickel cyanides as are capable of forming addition compounds with carbon monoxide or unsaturated aliphatic compounds wherein the linkage is reversible or the carbon monoxide or unsaturated compound is exchangeable with compounds containing cyano groups. Instead of the ready-made complex compounds we may also use compounds capable of forming such complex compounds, e. g. mixtures of alkali metal cyanides and nickel-II-cyanide. The corresponding complex iron or cobalt compounds may also be used, e. g. potassium ferrocyanide.

The catalysts defined above may be used in a state of dissolution or suspension. They may also be applied to the conventional carrier substances, such as aluminum oxide, silicic acid gel or pumice stone.

As starting materials I may use in particular acrylic acid and its lower homologues, for example methacrylic acid. Since the reaction is carried out in an alkaline medium, it is preferable to start from the alkali metal salts of these acids, in particular the sodium or potassium salts.

As initial materials may be mentioned in particular acrylic acid and its next higher homologues and the alkali salts of these acids. The reaction, for example in the case of acrylic acid, proceeds according to the following equation:

1. 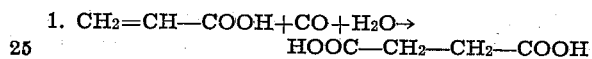

When acetylene is used as the initial material instead of acrylic acid, it is intermediately converted into acrylic acid according to the following equation:

2. 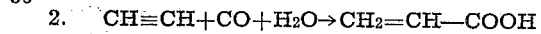

and the acrylic acid then further reacts according to Equation 1. In addition to the dicarboxylic acids, other products may be present in the reaction product, in particular products containing keto groups and products formed by the adding on of the hydrogen formed during the carbon monoxide conversion according to the equation:

3. 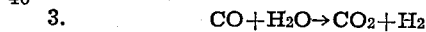

The reaction is carried out at elevated temperature, in particular at from 60° to 200° C. When starting from acetylene or its homologues, it is preferable to work in the lower part of the said temperature range, for example at from 60° to 110° C.; in the case of $\alpha,\beta$-unsaturated carboxylic acids, excellent yields are obtained in the upper part of the said range, for example at from 100° to 180° C. The speed of reaction depends to a large extent on the pressure employed. It is therefore preferred to work with a carbon monoxide partial pressure of at least 30 atmospheres, advantageously of at least 50 up to about 200 atmospheres or more. When employing acetylene, however, pressures of more than 30 to 40 atmospheres are not recommended for reasons of safety.

The reaction may be carried out according to the batch method in high pressure vessels or continuously, e. g. to the counter- or direct-current process with rigidly arranged catalysts while circulating the carbon monoxide or the carbon monoxide-acetylene mixture. When using such circulation, the carbon dioxide formed according to Equation 3 is preferably eliminated prior to reintroducing the carbon monoxide into the process. I may also work in the liquid phase with dissolved or suspended catalysts, if desired, while circulating carbon monoxide and eventually acetylene through the liquid.

I prefer to carry out the process while using water as a solvent, but I may also use or add other solvents, such as organic oxygen-containing solvents miscible with water, e. g. ethers or ketones or even saturated hydrocarbons. I may also dilute the gases taking part in the reaction. They may contain nitrogen, methane, or other gases. I may also use technical gases, such as water gas, or generator gas, or crude acetylene, for example acetylene obtained by treating low molecular paraffin hydrocarbons in the electrical arc or by incomplete combustion of such hydrocarbons with oxygen. The ratio between carbon monoxide and acetylene may vary to a large extent. The yields are especially good when the reaction medium is maintained continuously alkaline. This may be effected by adding alkali, advantageously weak alkali, as for example alkali carbonate, from the start and, when this is used up during the course of the reaction by the acid formed, adding further amounts thereof.

The following examples will further illustrate how my invention may be carried out in practice without restricting it to these examples.

*Example 1*

A stirring autoclave of stainless steel containing a solution of 282 grams of sodium acrylate, 280 grams of potassium carbonate and 50 grams of potassium nickel cyanide in 1170 grams of water is rinsed out several times with nitrogen and then with carbon monoxide, and then carbon monoxide is pressed in under a pressure of 150 atmospheres. The autoclave is then heated to 150° C., a pressure of 192 atmospheres thus being set up. This falls gradually to 162 atmospheres during the course of 24 hours by reason of the consumption of the carbon monoxide. After cooling, the autoclave is released from pressure and the pale colored reaction product is acidified with dilute sulfuric acid and extracted with ether. After distilling off the ether, there are recovered by distillation in vacuo at about 18 millimeters (mercury gauge) 240 grams of an unconverted about 50 per cent aqueous acrylic acid. The residue consists of 65 grams of succinic acid (M. P. 179° C.).

*Example 2*

A solution of 240 grams of potassium nickel cyanide $K_2[Ni(CN)_4]$ and 280 grams of potassium carbonate in 2000 grams of water is charged into a 5-liter vessel of stainless steel provided with stirring means. The air is driven out with nitrogen and the latter with an equimolecular mixture of acetylene and carbon monoxide, an then such an amount of the said mixture is pressed in that the total pressure amounts to 25 atmospheres. The reaction mixture is then heated to 90° to 100° C. while stirring, the pressure thus rising to 30 atmospheres. This pressure is maintained by continuously pressing in more of the acetylene-carbon monoxide mixture. Since part of the carbon monoxide is converted into carbon dioxide by a side reaction, the autoclave is released from pressure from time to time in order to remove the carbon dioxide, and then fresh acetylene-carbon monoxide mixture is pressed in. In the course of 27 hours, 150 atmospheres of the mixture have been absorbed in all. The pressure is then released, the dark reaction liquid is filtered off from a mixture of nickel cyanide and polyketone (about 70 grams) and a mixture of cyclopentanone and water first driven off from the filtrate. The condensate of this mixture forms two layers; from the upper layer, after drying with sodium sulfate, 73 grams of cyclopentanone (B. P. 130° to 131° C.) can be recovered by distillation. The remaining part of the filtrate is treated with animal charcoal and then pressure-hydrogenated in the presence of pure nickel with hydrogen under a pressure of 200 atmospheres, the temperature being slowly raised from 50° to 100° C. The hydrogenation product is filtered off and extracted with ether. By distillation of the ether extract, 12 grams of an oily product are obtained (boiling point at 2 to 3 millimeters (mercury gauge 70° to 190° C.). The solution remaining after the ether extraction is acidified with 25 per cent sulfuric acid and again extracted with ether. By distilling this extract 177 grams of dilute propionic acid are obtained. By cooling the distillation residue, it solidifies to crystals. They are filtered off and washed with toluene. 169 grams of almost pure succinic acid (M. P. 176° C.) are obtained.

What I claim is:

1. A process for producing aliphatic dicarboxylic acids which comprises reacting carbon monoxide and water with an $\alpha,\beta$-unsaturated monocarboxylic acid in an alkaline medium at elevated temperature and under increased pressure in the presence of a complex nickel cyanide catalyst.

2. A process for producing succinic acid which comprises reacting carbon monoxide and water with acrylic acid in an alkaline medium at elevated temperature and under increased pressure in the presence of a complex nickel cyanide catalyst.

3. A process for the production of succinic acid which comprises reacting carbon monoxide and water with acrylic acid in an alkaline medium at from 60° to 200° C. and a pressure of at least 30 atmospheres in the presence of a complex nickel cyanide catalyst.

4. A process for the production of succinic acid which comprises reacting carbon monoxide and water with acrylic acid in a liquid medium kept alkaline with alkali metal carbonate at from 60° to 200° C. and a pressure of at least 30 atmospheres in the presence of a complex nickel cyanide catalyst.

5. A process for the production of succinic acid which comprises reacting carbon monoxide and water with acrylic acid in a liquid medium kept alkaline with alkali metal carbonate at from 60° to 200° C. and under a pressure of at least 30 atmospheres in the presence of a complex alkali metal nickel cyanide catalyst.

6. A process as claimed in claim 5 wherein the catalyst is a complex potassium nickel cyanide catalyst.

7. A process for the production of succinic acid which comprises reacting carbon monoxide and acetylene in an aqueous medium kept alkaline with alkali metal carbonate at a total pressure of between 30 and 40 atmospheres and at 60° to 200° C. in the presence of a complex alkali metal nickel cyanide catalyst.

8. A process for producing aliphatic dicarboxylic acids which comprises reacting a compound from the group consisting of acetylene hydrocarbons, $\alpha,\beta$-unsaturated monocarboxylic acids prepared therefrom and alkali metal salts thereof with carbon monoxide and water in an alkaline medium at elevated temperatures and increased pressures in the presence of a complex nickel cyanide catalyst.

9. A process for producing aliphatic dicarboxylic acids which comprises reacting an acetylene hydrocarbon with carbon monoxide and water in an alkaline medium at elevated temperatures and increased pressures in the presence of a complex nickel cyanide catalyst to form an $\alpha,\beta$-unsaturated monocarboxylic acid and continuing the reaction to form aliphatic dicarboxylic acids.

10. A process for producing succinic acid which comprises reacting acetylene with carbon monoxide and water in an alkaline medium at from 60° C. to 200° C. and a pressure of at least 30 atmospheres in the presence of a complex alkali metal nickel cyanide catalyst to form an $\alpha,\beta$-unsaturated monocarboxylic acid and continuing the reaction to form aliphatic dicarboxylic acids.

11. A process for producing succinic acid which comprises reacting acetylene with carbon monoxide and water in an alkaline medium at from 60° C. to 200° C. and a pressure of at least 30 atmospheres in the presence of a complex nickel-cyanide catalyst to form an $\alpha,\beta$-unsaturated monocarboxylic acid and continuing the reaction to form aliphatic dicarboxylic acids.

12. A process for producing succinic acid which comprises reacting acetylene with carbon monoxide and water in an alkaline medium at from 60° C. to 200° C. and a pressure of at least 30 atmospheres in the presence of a complex potassium nickel-cyanide catalyst to form an $\alpha,\beta$-unsaturated monocarboxylic acid and continuing the reaction to form aliphatic dicarboxylic acids.

WALTER REPPE.

REFERENCES CITED

The following references are of record in the file of this patent:

UNITED STATES PATENTS

| Number | Name | Date |
|---|---|---|
| 2,448,368 | Gresham et al. | Aug. 31, 1948 |
| 2,562,393 | Reppe | July 31, 1951 |

OTHER REFERENCES

Reppe: "Acetylene Chem.," P. B. Report No. 18852-S, pp. 131–133 (1949).